United States Patent [19]

Meharg

[11] Patent Number: 5,184,421
[45] Date of Patent: Feb. 9, 1993

[54] LOCKING COVER FOR POTS

[76] Inventor: Stephen W. Meharg, 9869 Curries Crossing, Jonesboro, Ga. 30236

[21] Appl. No.: 661,120

[22] Filed: Feb. 27, 1991

Related U.S. Application Data

[63] Continuation-in-part of Ser. No. 443,154, Nov. 30, 1989.

[51] Int. Cl.⁵ ................................................ A45B 3/00
[52] U.S. Cl. ........................................ 47/66; 47/25; 47/84
[58] Field of Search .......................... 47/25, 66, 32, 84

[56] References Cited

U.S. PATENT DOCUMENTS

| | | | |
|---|---|---|---|
| 2,828,789 | 4/1958 | Groendyk | 47/66 |
| 3,961,443 | 6/1976 | Insalaco | 47/66 |
| 4,369,598 | 1/1983 | Beckwith | 47/66 |
| 4,995,192 | 2/1991 | DeWid | 47/25 |
| 5,058,317 | 10/1991 | McMurtrey | 47/25 |
| 5,085,001 | 2/1992 | Crawley | 47/25 |

FOREIGN PATENT DOCUMENTS 943717 12/1963 United Kingdom .................... 47/66

*Primary Examiner*—Henry E. Raduazo
*Attorney, Agent, or Firm*—James B. Middleton

[57] ABSTRACT

A pot cover covers the dirt in a flower pot, and locks to the pot to prevent scattering of the dirt and to prevent access by a small child or pet. The pot cover is a disk that is normally flat. The disk is split so the disk can be overlapped to cause the disk to become conical. The cover has water holes to allow adequate moistening of the soil. There is a hole in the cover for the stem of the plant, and the area surrounding the hole has easily removable rings to allow expansion of the hole. A skirt is attached to the cover, the skirt being adapted to be fixed to the pot. In one form, the skirt locks firmly around the perimeter of the pot. In another form, tabs on the skirt engage a lip of the pot.

7 Claims, 1 Drawing Sheet

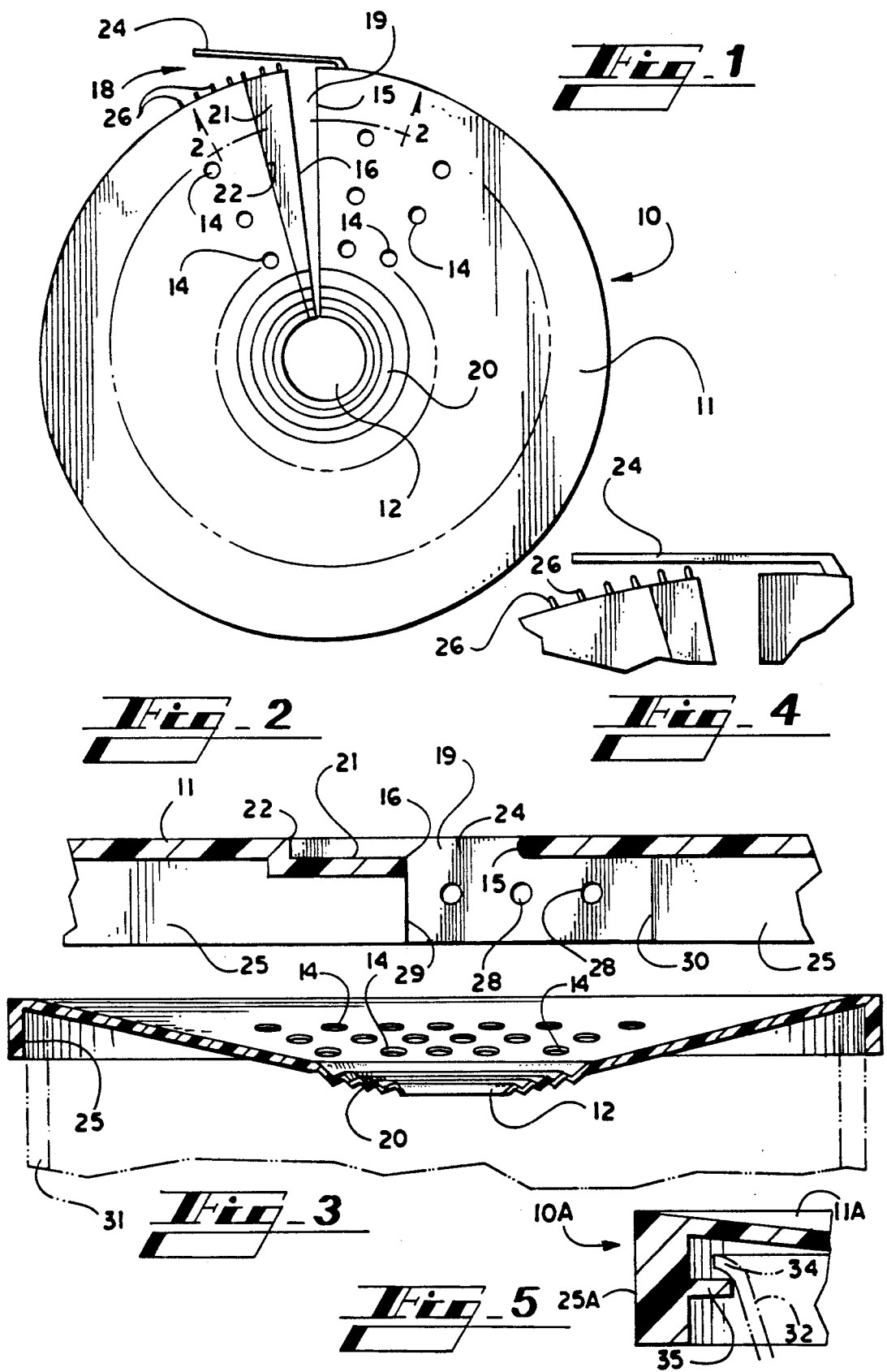

LOCKING COVER FOR POTS

CROSS-REFERENCE TO RELATED APPLICATION

This application is a continuation-in-part of the copending application of the same inventor, filed Nov. 30, 1989, and having Ser. No. 443,154.

INFORMATION DISCLOSURE STATEMENT

Indoor plants are quite common, and are maintained in many sizes from very small decorative plants to relatively large trees. While potted plants are enjoyed by many, they have the distinct disadvantage that the plants grow in dirt, and the dirt frequently becomes scattered from the pot to the nearby household area. While the dirt should of course remain in the pot, the dirt can become scattered through overly vigorous watering, strong currents of air, and the like. Also, in the most popular size of potted plant, it is relatively easy for the pot to be turned over so dirt simply falls out of the pot.

Another distinct disadvantage of potted plants is that cats seem to be attracted to the plants. Very small pots cause a problem in that a cat may turn the pot over. Large pots cause a problem because cats habitually perform their bodily excretions in dirt, and large pots for plants tend to invite cats for this purpose. Furthermore, a cat typically digs a hole in the dirt, and subsequently scratches in the dirt to cover the hole. Such activities are not very healthy for the plant, and also cause significant litter in the vicinity of the potted plant.

The prior art contemplates the use of a cover for potted plants or the like, but such covers have normally simply rested on top of the dirt to provide a more attractive appearance and have not provided complete protection from the litter resulting from a potted plant. The patent to Insalaco, No. 3,961,443 includes a latch, but neither the cover nor the latch is adjustable, so the cover still may not fit snugly on the selected pot.

SUMMARY OF THE INVENTION

This invention relates generally to pot covers, and is more particularly concerned with a pot cover for a flower pot which will lock to a flower pot and allow normal growth of a plant and watering of the plant with the cover in place.

The present invention provides a cover for the dirt in a potted plant. The cover is sized to cover the entire pot; and, the cover includes a skirt having locking means. The skirt can therefore extend around the outer edge of the pot, and the locking means will fix the skirt to the pot. The locking means is variable to fit different sizes of pots. The cover portion of the pot cover defines a central opening, the opening being surrounded by removable concentric circles so the opening can be selectively enlarged to accommodate the plant within the pot. The cover portion of the pot cover is normally flat, but becomes concave when the skirt is pulled in to be fixed to the pot. The cover also defines a plurality of openings therein to allow water to flow through the cover and into the dirt. The cover may be transparent to allow visual monitoring of the soil for accuracy in watering and the like.

BRIEF DESCRIPTION OF THE DRAWINGS

These and other features and advantages of the present invention will become apparent from consideration of the following specification when taken in conjunction with the accompanying drawings in which:

FIG. 1 is a top plan view showing a pot cover made in accordance with the present invention;

FIG. 2 is an enlarged, fragmentary cross-sectional view taken substantially along the line 2—2 in FIG. 1;

FIG. 3 is a cross-sectional view showing the pot cover of FIG. 1 fixed to a pot, the pot being shown in phantom;

FIG. 4 is an enlarged, fragmentary view showing the locking means of the device shown in FIG. 1; and, FIG. 5 is an enlarged, fragmentary view showing a modified form of the device illustrated in FIG. 1.

DETAILED DESCRIPTION OF THE EMBEDMENTS

Referring now more particularly to the drawings, and to those embodiments of the invention here presented by way of illustration, the device shown in FIG. 1 includes a pot cover 10 including a cover portion 11, and a depending skirt portion not shown in FIG. 1. The cover portion 11 includes a central opening 12, and a plurality of water holes 14 distributed generally around the surface of the cover portion 11.

The pot cover 10 is split along a radius 15, and a sector of the circle is removed between the radius 15 and a radius 16. At this open space, the pot cover 10 includes locking means generally indicated at 18 for selectively closing the open sector of the cover 10.

It will be understood by those skilled in the art that one may wish to install the pot cover 10 on a pot that already has a growing plant. The peripheral opening 19 is therefore required for this installation. Utilizing this open area 19, it will be understood that the pot cover 10 can be opened and slipped around the growing plant and over the pot, so the plant will be within the opening 12. With the plant within the opening 12, the pot cover 10 can be latched around the pot as will be further discussed below.

As is shown in FIG. 1 of the drawings, there are concentric rings 20 around the opening 12. The rings 20 comprise removable sections to adjust the size of the hole 12 in order to accommodate larger plants, or plants that are somewhat off-set from the center of the pot. The construction will be discussed in more detail hereinafter.

Looking again at the opening 19, the opening comprises a missing sector; and, an additional sector 21 is offset downwardly, the sector 21 being defined between the radius 16 and a radius 22. As is better shown in FIG. 2 of the drawings, the sector 21 is offset sufficiently to receive a portion of the cover portion 11 thereover.

Considering the above described construction, those skilled in the art will understand that, when a flat, circular member has a sector removed, and the remaining edges, or radii, are brought together, the flat circular member becomes conical. This phenomenon is utilized in the present invention. The cover portion 11 is formed, or molded, flat and the sector 19 is omitted. The edges o the sectors 19 and 21 can then be moved towards each other, and the pot cover 10 will become conically shaped, the opening 12 causing the shape to be frustoconical.

With attention directed to FIGS. 1, 2 and 4 of the drawings, it will be seen that there is a latching means generally designated at 18. The latching means 18 includes a strap 24 carried by a skirt 25 depending form the cover portion 11. The latching means 18 is on one side of the sector 19, and a plurality of studs 26 are carried by the skirt 25 on the opposite side of the sector 19. The strap 24 defines a plurality of holes 28 therein, the holes 28 being spaced apart the same distance as the studs 26. As a result, the strap 24 can be placed in any of a plurality of positions and engaged with the studs 26.

The pot cover 10 is therefore usable on a range of pot sizes. One would generally wish to urge the radius 15 at least to the radius 16 to close the open sector 19 therebetween. This amount of distortion of the cover portion 11 will cause the cover portion 11 to be somewhat conical. As the radius 15 is moved further, approaching the radius 22, the height of the cone will become greater, and the angle at which the cover portion 11 slopes into the pot becomes greater.

Thus, the flat cover 11 will become somewhat sloped on the largest pot for which the pot cover 10 will be used. As the pot becomes smaller, the radius 15 will be moved further towards the radius 22, and the cover 11 will become more sloped. When the skirt 25 is pulled tightly against the walls of the pot, the strap 24 will be engaged with the studs 26 to latch the cover and hold the cover in place.

As is best shown in FIG. 2 of the drawings, the skirt 25 also defines a gap. At the radius 16, the skirt 25 terminates as indicated by the edge 29. However, the skirt 25 terminates before the radius 15, as indicated at 30. Due to this arrangement, the cover portion 11 can overlap the downwardly off set sector 21 before the edges 29 and 30 abut each other.

With the foregoing description in mind, it can be seen in FIG. 3 that a pot cover 10 is fixed to a pot shown in phantom and designated at 31. The skirt 25 of the pot cover 10 engages the walls of the pot 31, and will of course be held snugly thereagainst as was discussed above. The cover portion 11 slopes downwardly to the concentric rings 20 and the central opening 12.

It is clearly shown in FIG. 3 that the concentric rings 20 are formed in an accordion fold configuration, and that the rings 20 are thinner than the rest of the cover portion 11. As a result, one would find it easy to sever the cover portion 11 to remove one or more of the concentric rings 20 and enlarge the opening 12. Those skilled in the art will understand that no particular number of rings 20 is required, but any number may be used to allow any desired degree of enlargement of the opening 12.

Many potted plants are purchased in plastic pots that have an outwardly turned uppermost edge. Though these pots are not particularly attractive for display, it is reasonably common practice to leave the potted plant in the pot, and place the entire pot within a more attractive pot. A pot cover made in accordance with the present invention may be useful for these inexpensive but commonly used pots. Thus, a modified form of the pot cover of the present invention is shown in FIG. 5 of the drawings.

Looking at FIG. 5, there is a pot indicated fragmentarily in phantom and designated at 32. The pot 32 includes an outwardly turned edge or lip 34. The pot cover shown in conjunction with the pot 32 will be made substantially identically to the pot cover shown in FIGS. 1-4, therefore the pot cover shown in FIG. 5 carries the same reference numerals but with an a suffix.

It will be readily seen that the only difference between the pot cover 10A shown in FIG. 5 and the pot cover 10 shown in FIGS. 1-4 is the presence of one or more tabs such as the tab 35. Looking at FIG. 5, it will be seen that the tab 35 is formed integrally with the skirt portion 12A, and extends inwardly. The outwardly turned lip 34 of the pot 32 is therefore engaged by the tab 35.

It will be readily understood that the skirt portion 12A cannot latch sufficiently firmly about the outwardly turned lip 34 of the pot 32 to prevent the pot cover 10A from being inadvertently removed from the pot 32. The provision of the tabs 35 allows the pot cover 10A to be locked to the pot 32, it being understood that there will be a plurality of the tabs 35 distributed around the perimeter of the pot cover 10A. Though only one tab 35 is here shown, those skilled in the art will readily understand the complete construction without further illustration or description.

From the above discussion, it will be readily understood by those skilled in the art that the pot cover 10 or 10A can be made of numerous materials, and may have numerous decorative features. It is contemplated that the pot cover 10 will be transparent to allow a person to monitor the soil to be sure of proper watering and the like. Nevertheless, the pot cover 10 or 10A will be equally effective if made translucent or opaque.

It is contemplated that the pot cover 10 or 10A will be made of a thermoplastic elastomer since this will provide ease in fabrication of the device by injection molding or the like, while maintaining sufficient tolerances for the device to be easily usable. Thus, the pot cover of the present invention may be made of polyvinyl chloride, this being quite inexpensive, yet durable and sufficiently elastic to function well. Other plastics that rather obviously could be used include the polyolefins, polyamides and halogenated hydrocarbons. Further materials will suggest themselves to those skilled in the art.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. A pot over for a flower pot, said flower pot including a circumferential wall, said pot cover comprising a cover portion having a size and shape to substantially cover said pot and defining an open sector between a first radius and a second radius, said over portion having a perimeter and a skirt portion carried by said cover portion at said perimeter, said skirt portion having a perimeter substantially equal to said perimeter of said cover potion, and locking means for closing said open sector for locking said skirt to said pot, said cover portion being normally flat, said cover portion becoming conical as said first radius is moved towards said second radius to close said open sector, said cover portion defining a central opening therein for extension of a plant therethrough, said locking means including a strap fixed to said skirt on one side of said sectors id strap defining at least one hole therein, and at least one stud fixed to said skirt on the opposite side of said sector, said at least one stud being receivable in said at least one hole in said strap.

2. A port cover as claimed in claim 1, said cover portion including removable rings concentric with said central opening for selectively enlarging said central opening.

3. A pot cover for a flower pot including a circumferential wall, said pot cover comprising a cover portion having a size and shape to substantially over said pot and defining an open sector between a first radius and a second caries, said cover portion having a perimeter and a skirt portion carried by said cover portion at said perimeter, said skirt portion having a perimeter substantially equal to said perimeter of said cover potion, and locking means for closing said open section for locking said skirt to said port, said cover portion being normally flat, said cover portion becoming conical as said first radius is moved towards said second radius to close said sector, said cover portion defining a central opening therein for extension of a plant therethrough, said locking means including a strap fixed to said skirt on one side of said sector, said strap defining at least one hole therein, and at lest one stud fixed to said skirt on the opposite side of said sector, said at least one stud being receivable in said at least one hole in said strap, said cover portion further including a downwardly offset section between said second radius and a third radius, said cover portion at said first radius being receivable over said downwardly offset sector for further reducing the diameter of said cover portion.

4. A pot cover as claimed in claim 3, said cover portion including removable rings concentric with said central opening for selectively enlarging said central opening.

5. A pot cover as claimed in claim 4, said removable rings comprising accordion-like folds having less thickness than the thickness of said cover portion.

6. A pot cover as claimed in claim 5, said pot including an outwardly turned lip, said pot cover further including at least one tab fixed to said skirt portion and extending inwardly therefrom, the arrangement being such that said at least one tab extends below said outwardly turned lip to fix said pot cover to said pot.

7. A pot cover as claimed in claim 6, said cover portion defining a plurality of holes therein for allowing water to enter said pot before reaching said central opening.

* * * * *